United States Patent [19]
Lee

[11] Patent Number: 6,023,219
[45] Date of Patent: Feb. 8, 2000

[54] MISSING VEHICLE DETECTION SYSTEM BY USING A CAR AUDIO SYSTEM

[75] Inventor: Young-Woo Lee, Incheon, Rep. of Korea

[73] Assignee: Daewoo Electronics Co., Ltd., Seoul, Rep. of Korea

[21] Appl. No.: 09/131,289

[22] Filed: Aug. 7, 1998

[30] Foreign Application Priority Data

Aug. 8, 1997 [KR] Rep. of Korea ...................... 97-37839
Aug. 8, 1997 [KR] Rep. of Korea ...................... 97-37841

[51] Int. Cl.[7] .............................. B60R 25/10; G08B 13/00
[52] U.S. Cl. ...................... 340/426; 340/425.5; 340/539; 340/825.31; 307/10.2; 307/10.4
[58] Field of Search ................................. 340/426, 425.5, 340/539, 904, 543, 825.13, 825.31, 825.32; 307/10.2, 10.4, 10.5

[56] References Cited

U.S. PATENT DOCUMENTS

| | | | |
|---|---|---|---|
| 4,683,462 | 7/1987 | Takeda et al. | 340/571 |
| 5,003,317 | 3/1991 | Gray et al. | 342/457 |
| 5,334,974 | 8/1994 | Simms et al. | 340/426 |
| 5,418,537 | 5/1995 | Bird | 342/357 |

*Primary Examiner*—Donnie L. Crosland
*Attorney, Agent, or Firm*—Jacobson, Price, Holman & Stern, PLLC

[57] ABSTRACT

A system which can detect a vehicle that is missing or stolen on the basis of a missing vehicle signal which is transmitted from a car audio system in which a transmission apparatus is installed for transmitting the missing vehicle signal. When the car audio is initiated, a transmission control part causes a first display to show a message requesting to input a password and causes an audio part to mute an outputting of the audio sound. When the password is inputted by a keyboard, the control part causes an audio part to stop muting the audio sound, and causes a transmission part to transmit the missing vehicle signal when the password inputted from the keyboard is different from a password stored in a first memory. A receiving apparatus includes an alarm generation part for ringing an alarm sound, a receiving part for receiving the missing vehicle signal, a demodulation part for demodulating the missing vehicle signal in order to detect data included in the missing vehicle signal, a modem for transmitting the data through a telephone line, and a receiving control part for controlling the alarm generation part, the display, and the modem according to whether the receiving part receives the missing vehicle signal or not.

4 Claims, 4 Drawing Sheets

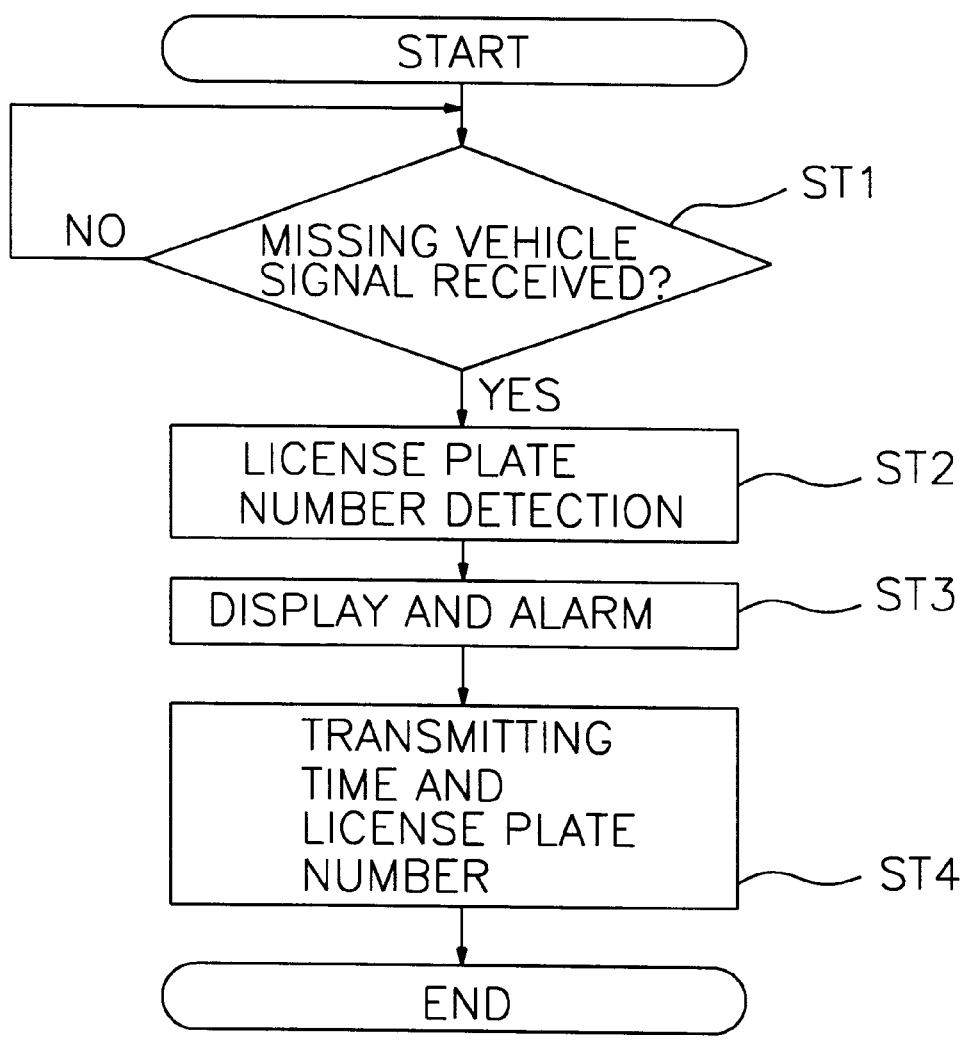

MISSING VEHICLE DETECTION SYSTEM BY USING A CAR AUDIO SYSTEM

BACKGROUND OF THE INVENTION

1. Field of the Invention

This invention relates to a system for detecting missing vehicles, more particularly a system which can detect a missing vehicle on the basis of a signal which is transmitted from a car audio which is installed within the missing vehicle.

2. Prior Art

Various apparatuses for detecting missing vehicles have been suggested in the prior art.

One example of an apparatus for detecting missing vehicles is disclosed in U.S. Pat. No. 5,418,537 to David G. Bird. The apparatus described in the David G. Bird patent uses the Global Positioning System(hereinafter, referred to as GPS) for detecting the present position of a missing vehicle. GPS receives GPS signals which are transmitted from two or more GPS satellites. The apparatus includes a paging responder which responds to a paging signal transmitted from a vehicle location service center. The paging responder causes a controller/modem to interrogate a GPS receiver/processor to determine the present location of the vehicle. The controller/modem then causes a cellular telephone to notify the vehicle location service center of the present location of the missing vehicle, so that the vehicle can be recovered.

However, it is expensive to use the GPS receiver for receiving the GPS signals and the processor for determining the present location of the missing vehicle with the GPS signals. Further, a prerequisite exists that the vehicle to be installed with the apparatus must first be equipped with the mobile telephone.

SUMMARY OF THE INVENTION

It is one object of the present invention to provide a system for detecting missing vehicles, the price of which is more low.

Another object of the present invention is to provide a system for detecting missing vehicles which can be facilitated by being installed within the vehicle.

In order to achieve the above objects, a system according to one aspect of the present invention provides a car audio and a receiving apparatus. The car audio includes a keyboard having a plurality of keys and for generating a key signal corresponding to one of the plurality of keys which is selected; a radio part for receiving a broadcasting signal and producing a first audio signal which is included in the broadcasting signal; a cassette deck part for reproducing a second audio signal which is recorded on a cassette tape; an audio part for driving at least one speaker according to either the first audio signal or the second audio signal; a memory for storing a password and a license plate number; a transmission part for generating a missing vehicle signal on the basis of the license plate number and for transmitting the missing vehicle signal through a transmission antenna; a display for displaying messages; and a control part for controlling each of the radio part, the cassette deck part, the audio part, the transmission part, the display, and the audio part in response to at least one key signal generated from the keyboard. When the control part determines that the car audio is initiated, the control part determines whether the car audio is initiated based on an inputting of power to the car audio. The control part causes the display to display a message requesting to input the password and causes the audio part to mute outputting of an audio sound. When key signals are inputted from the keyboard, the control part causes the audio part to output the audio sound and determines whether the key signals are identical with the password stored in the memory. Further, the control part causes the transmission part to transmit the missing vehicle signal when the key signals are different from the password stored in the memory.

And, the receiving apparatus receives the missing vehicle signal generated from the car audio. The apparatus includes an alarm generation part for ringing an alarm sound; a receiving part for receiving the missing vehicle signal which is included in a predetermined spectrum; a demodulation part for demodulating the missing vehicle signal which is received by the receiving part in order to detect data included in the missing vehicle signal; a display for displaying the data detected by the demodulation part; a modem for transmitting the data through a telephone line; and a control part for controlling the alarm generation part, the display, and the modem depending on whether the receiving part receives the missing vehicle signal or not.

According to the present invention, a missing vehicle signal which is generated from a transmission apparatus installed within a missing vehicle is received in a receiving apparatus, such that the missing vehicle is detected.

BRIEF DESCRIPTION OF THE DRAWINGS

This invention will be better understood and its various objects and advantages will be more fully appreciated from the following description taken in conjunction with the accompanying drawings, in which;

FIG. 4 is a flow chart for illustrating the operation of the receiving apparatus.

DETAILED DESCRIPTION OF THE PREFERRED EMBODIMENT

Preferred embodiments of the present invention will be illustrated below with reference to the accompanying drawings.

Figure 1:
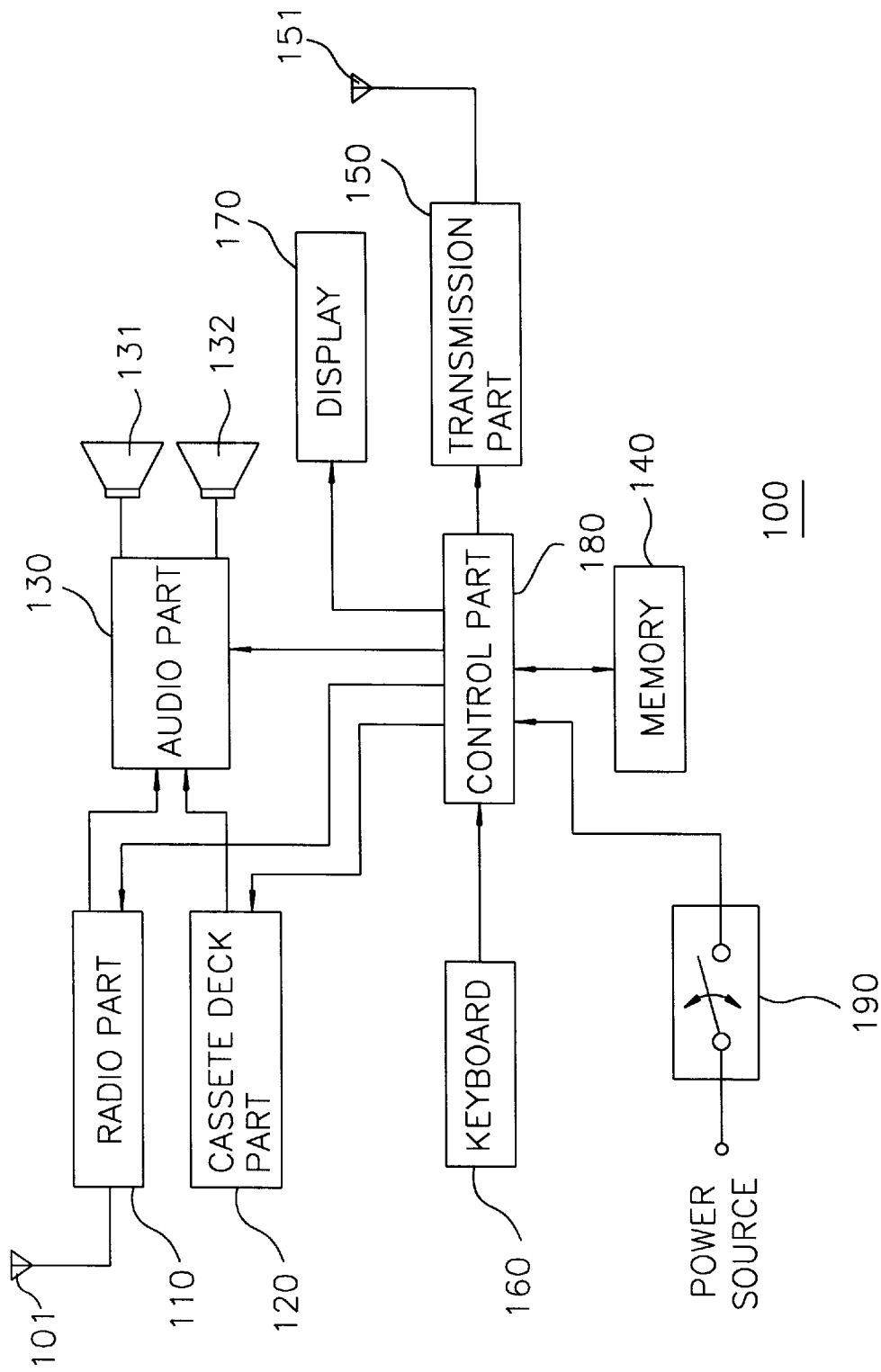
FIG. 1 is a block diagram for showing a car audio on which a transmission apparatus is mounted according to one embodiment of the present invention.

FIG. 1 is a block diagram for showing a car audio on which a transmission apparatus is mounted according to one embodiment of the present invention.

Referring to FIG. 1, the car audio 100 includes a radio part 110, a cassette deck part 120, and an audio signal processing part 130 for performing audio functions. The car audio 100 further includes a memory 140 and a transmission part 150 for transmitting a missing vehicle signal. Further, the car audio 100 includes a keyboard 160 for inputting a password and instructions, etc. by a user, a display 170 for displaying a message or a function being presently performed by the car audio 100, and a control part for overall controlling the car audio 100.

The radio part 110 performs the same function as that of a conventional radio receiver. That is, the radio part 110 selects one of the broadcasting signals inputted through a receiving antenna 101 and produces a broadcasting program signal by demodulating the selected broadcasting signal, such that an audio signal is generated.

The cassette deck part 120 performs the same function as that of a conventional cassette player. That is, the cassette deck part 120 either reproduces an audio signal recorded on the cassette tape or records an audio signal.

The audio part 130 selects either the radio signal from the radio part 110 or the reproduced signal from the cassette deck part 120 under the control of the control part 180 and amplifies a selected signal. And then, the audio part 130 drives a left speaker 131 and a right speaker 132 according to the amplified signal, thereby outputting an audio sound corresponding to the amplified signal. Further, the audio output of the audio part 130 through the left and right speakers 131 and 132 can be muted by the control part 180. That is, when a muting signal is inputted from the control part 180 to the audio part 130, the audio part 130 mutes the outputting of the amplified signal to the left and right speakers 131 and 132.

The memory 140 stores data which is needed for controlling the car audio 100. Preferably, the data include a password and a license plate number. Further, the password is preferably authorized by a driver who drives a car in which the car audio will be installed.

The transmission part 150 is controlled by the control part 180. The transmission part 150 modulates a frequency carrier with the data of the license plate number thereby to generate a modulated carrier signal and transmits the modulated carrier signal as a missing vehicle signal through the transmission antenna 151 in response to a transmission control signal provided from the control part 180.

The keyboard 160 includes a plurality of keys either to select one of the typical car audio functions or to input a password by the user. When the user selects one of the plurality of keys, the keyboard 160 generates a key signal corresponding to the selected key.

The display 170 displays a message under the control part 180.

The control part 180 controls the audio part 130 and the display 170 in response to key signals generated by the keyboard 160. When the input of power into the car audio 100 is initiated by driving a power switch of the car audio 100, the control part 180 causes the display 170 to display a message requesting the user to input the password, At the same time, the control part 180 controls the audio part 130 to mute the output of an audio signal.

When the user inputs a password with the keyboard 160 according to the message, the control part 180 makes the audio part 130 to be released from the muting of outputting the audio signal through the left and right speakers 131 and 132. And then, the control part 180 reads out a memorized password from the memory 140 and compares the memorized password with the inputted password from the keyboard 160 to determine whether the memorized password is identical with the inputted password, such that the control part 180 determines whether the car is driven by an authorized driver or not.

When the input password is different from the inputted password, such that the control part 180 determines the car is driven by an unauthorized driver, the control part 180 reads out the license plate number from the memory 140 and provides the license plate number to the transmission part 150. And then, the control part 180 controls the transmission part 150 to transmit the missing vehicle signal generated by modulating the license plate number.

To the contrary, when the input password is identical with the inputted password, the control part 180 determines the car is driven by the authorized driver, such that the transmission part 150 is disabled.

Hereinafter, the operation of the car audio 100 will be described with reference to FIG. 2.

Figure 2:
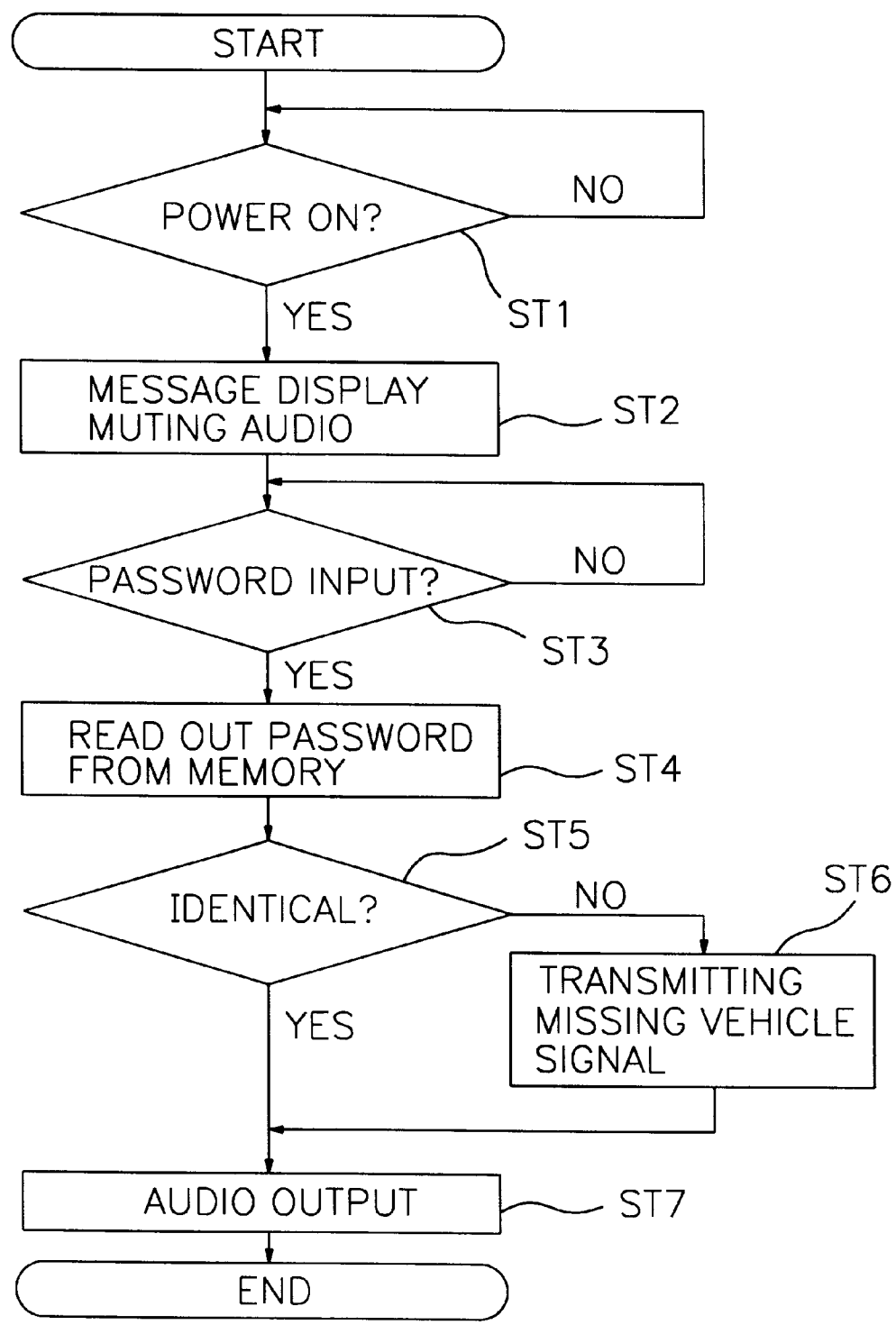
FIG. 2 is a flowchart for illustrating the operation of the car audio.

FIG. 2 is a flowchart for illustrating the operation of the car audio 100.

Referring to FIG. 2, when a driver causes the power switch 190 to be turned on to operate the car audio 100, in step 1 the control part 180 determines the car audio is initiated. At this time, before performing an audio function as the car audio, in step 2 the control part 180 causes the display 170 to display the message asking the driver to input a password(ST1, ST2).

In step 3 the control part 180 determines whether the password is inputted from the keyboard 160(ST3).

If the driver does not input the password, the control part 180 remains on standby until the password is inputted from the keyboard 160. While being on standby, the control part 180 controls the audio part 130 to mute the outputting of the audio signal to the left and right speakers 131 and 132. To the contrary, when the password is inputted from the keyboard 160, the control part reads out the memorized password from the memory 140 and compares the memorized password with the inputted password from the keyboard 160 in order to determine whether the car is driven by an authorized driver or not(ST4, ST5).

In step 5 when the inputted password is different from the memorized password, the control part 180 determines that the car is driven by an unauthorized driver. And then, by step 6 the control part 180 reads out the license plate number from the memory 140 and provides the license plate number to the transmission part 150. When the license plate number is inputted to the transmission part 150, the transmission part 150 transmits the license plate number through the transmission antenna 151. That is, the transmission part 150 modulates the frequency carrier according to the data signal of the license plate number in response to a transmission instruction signal generated from the control part 180, and transmits the modulated carrier signal as the missing vehicle signal through the transmission antenna 151(ST6).

To the contrary, when the inputted password is identical with the memorized password, the control part 180 determines the car is driven by an authorized driver. And then, the control part 180 controls the audio part 130 to release the muting operation of the audio part 130, thereby outputting an audio signal through the left and right speakers 131 and 132(ST7).

Figure 3:
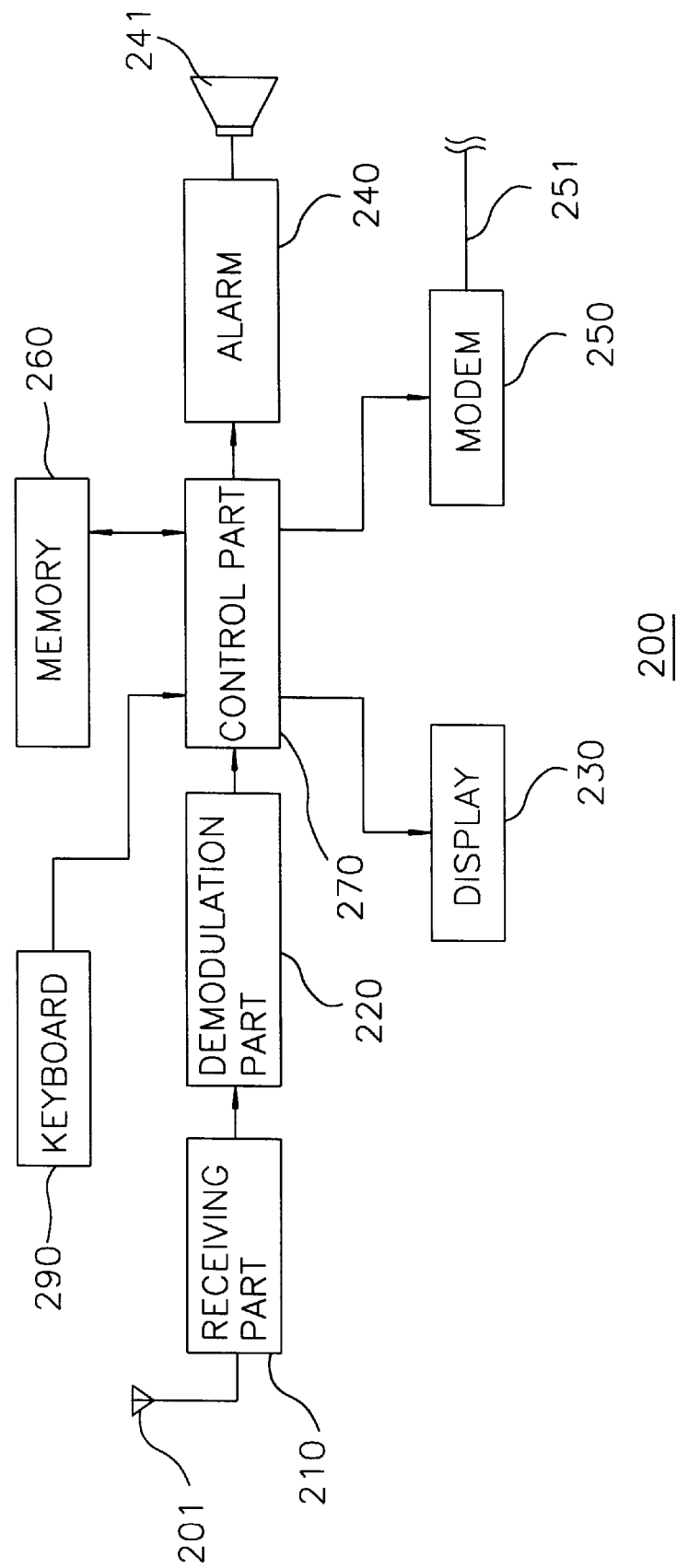
FIG. 3 is a block diagram for showing a receiving apparatus according to one embodiment of the present invention.

FIG. 3 is a block diagram for showing a receiving apparatus 200 according to one embodiment of the present invention.

Referring to FIG. 3, the receiving apparatus 200 includes a receiving part 210, a demodulation part 220, a display 230, an alarm part 240, a modem 250, a control part 270, and a keyboard 290.

The receiving part 210 detects the missing vehicle signal among signals inputted through an antenna 21, which is generated from the car audio 100, and generates a received signal.

The demodulation part 220 demodulates the received signal, and provides a demodulated signal to the control part 270.

The display 230 displays an operation state of the receiving apparatus 200 and a key input from the keyboard 290 in response to a display control signal from the control part 270.

The alarm part 240 generates an alarm signal in response to an alarm control signal from the control part 270 and drives a speaker 241 according to the alarm signal, thereby outputting an alarm sound to an exterior.

The modem 250 is connected with an telephone line. The modem 250 transmits data via the telephone line 251 in response to a modem control signal from the control part 270.

The memory 260 stores data which are needed when the control part 270 controls each part of the receiving apparatus 200. Further, the memory 260 stores data demodulated by the demodulation part 220.

The control part 270 determines, on the basis of the data from the demodulation part 220, whether the receiving part 210 receives the missing vehicle signal. When the receiving part 210 receives the missing vehicle signal, the control part 270 corrects an error included in the data. The control part 270 accesses the license plate number from the data, and stores the license plate number in the memory 260.

Further, the control part 270 generates the display control signal and provides the display control signal to the display 230, such that the display 230 is caused to display the fact of detecting a missing vehicle. Further, the control part 270 causes the alarm part 240 to output the alarm sound through the speaker 241. Further, the control part 270 controls the modem 250 to transmit the license plate number stored in the memory 260 through the telephone line 251 to an exterior base station.

Operations of the receiving apparatus 200 depicted in FIG. 3 will be described below with reference to FIG. 4.

FIG. 4 is a flow chart for illustrating the operation of the receiving apparatus 220.

Referring to FIG. 4, when the missing vehicle signal which is transmitted from the car audio 100 installed within a missing vehicle is inputted to the antenna 201, the missing vehicle signal is received by the receiving part 210(ST1).

When the receiving part 210 receives the missing vehicle signal, the missing vehicle signal received by the receiving part 210 is provided to the demodulation part 220. When the missing vehicle signal is inputted to the demodulation part 220, the demodulation part 220 demodulates the missing vehicle signal thereby to generate a data signal included in the missing vehicle signal and provides the data signal to the control part 270. Then, the control part 270 detects the license plate number from the data signal and provides the license plate number to the memory 260, such that the memory 260 is caused to store the license plate number (ST2).

And then, the control part 270 causes the alarm part 240 to output the alarm sound and controls the display 230 to display a message that the missing vehicle having the license plate number is detected(ST3).

At the same time, the control part 270 controls the modem 250 to transmit the license plate number via the telephone line to a base station(ST4).

Therefore, according to the present invention, when the car on which the car audio is installed is driven by an unauthorized driver and the car audio is initiated by him, the car audio transmits the missing vehicle signal. And then, the receiving apparatus receives the missing vehicle signal and transmits the license plate number included in the missing vehicle signal to the base station by the modem, such that the missing vehicle is detected.

While this invention has been particularly shown and described with reference to particular embodiments thereof, it will be understood by those skilled in the art that various changes in form and details may be effected therein without departing from the spirit and scope of the invention as defined by the appended claims.

What is claimed is:

1. A car audio for transmitting a missing vehicle signal, the car audio comprising:

a keyboard having a plurality of keys and for generating a key signal corresponding to one of the plurality of keys which is selected;

a radio part for receiving a broadcasting signal and producing a first audio signal which is included in the broadcasting signal;

a cassette deck part for reproducing a second audio signal which is recorded on a cassette tape;

an audio part for driving at least one speaker according to either the first audio signal or the second audio signal;

a memory for storing a password and a license plate number;

a transmission part for generating a missing vehicle signal on the basis of the license plate number and for transmitting the missing vehicle signal through a transmission antenna;

a display for displaying messages; and a control part for controlling each of the radio part, the cassette deck part, the audio part, the transmission part, and the display in response to at least one key signal generated from the keyboard, the control part for determining whether the car audio is initiated based on an inputting of power to the car audio, wherein the control part causes the display to display a message requesting to input the password and causes the audio part to mute outputting of an audio sound when the control part determines that the car audio is initiated, wherein the control part causes the audio part to output the audio sound and determines whether the key signals are identical with the password stored in the memory when key signals are inputted from the keyboard, wherein the control part causes the transmission part to transmit the missing vehicle signal when the key signals are different from the password stored in the memory.

2. A system for detecting a missing vehicle comprising:

a car audio which includes an audio part and a transmission apparatus, wherein the audio part includes a keyboard, a tuner, a cassette deck, and a circuit for driving one or more speakers according to an audio signal from either the tuner or the cassette deck in order to output an audio sound, and the transmission apparatus includes a first memory for storing a password and a license plate number of the missing vehicle therein, a transmission part for transmitting a missing vehicle signal based on data stored in the first memory, a first display for displaying messages showing a current operation state of the car audio, and a transmission control part for controlling the car audio, the transmission part, and the display according to a key signal inputted from the keyboard and whether the car audio is initiated, wherein when the car audio is initiated, the transmission control part causes the first display to show a message requesting to input the password and causes the car audio to mute an outputting of the audio sound, wherein when the password is inputted by the keyboard, the control part causes the muting means to stop muting the audio sound, and causes the transmission part to transmit the missing vehicle signal when the password inputted from the keyboard is different from the password stored in the first memory; and a receiving apparatus which includes an alarm generation part for ringing an alarm sound, a receiving part for receiving the missing vehicle signal, a demodulation part for demodulating the missing vehicle signal in order to detect data included in the missing vehicle signal, a modem for transmitting the data through a telephone line, and a receiving control part for controlling the alarm generation part, the display, and the modem depending on whether the receiving part receives the missing vehicle signal or not.

3. A system as claimed in claim 2, wherein said receiving apparatus further includes a second display for displaying the data detected by the demodulation part, wherein the receiving control part controls the second display depending on whether the receiving part receives the missing vehicle signal or not.

4. A system as claimed in claim 2, wherein said receiving apparatus further includes a second memory for storing the data and a time when the receiving part receives the missing vehicle signal.

* * * * *